United States Patent [19]

Hilton

[11] Patent Number: 5,187,503
[45] Date of Patent: Feb. 16, 1993

[54] ADJUSTABLE EYEGLASS FRAMES

[76] Inventor: Carole T. Hilton, 41770 Margarita, No. 2092, Temecula, Calif. 92390

[21] Appl. No.: 650,087

[22] Filed: Feb. 4, 1991

[51] Int. Cl.⁵ .............................................. G02C 5/04
[52] U.S. Cl. ..................................... 351/128; 351/124
[58] Field of Search ............... 351/128, 124, 136, 137

[56] References Cited

U.S. PATENT DOCUMENTS

| | | | |
|---|---|---|---|
| 2,887,008 | 5/1959 | Gross | 351/128 |
| 3,610,743 | 10/1971 | Lindblom | 351/128 |
| 4,448,501 | 5/1984 | Cogez | 351/128 |

Primary Examiner—Rodney B. Bovernick
Attorney, Agent, or Firm—Litman, McMahon & Brown

[57] ABSTRACT

An adjustable eyeglass frame includes a face bar with opposite ends and a pair of lens subframes each mounting a nose pad assembly and a temple. The lens subframes are adjustably mounted on the face bar by mounting structures slidably received in channel portions. The lens subframes can be locked in place with respect to the face bar by interlocking lands and grooves, by crimping or by frictional engagement. An alternative or modified embodiment eyeglass frame includes nose pad assemblies which are slidably, adjustably mounted on the face bar. In another alternative or modified eyeglass frame, the lens subframes include top-mounted tubes for telescopically receiving end portions of the face bar.

14 Claims, 2 Drawing Sheets

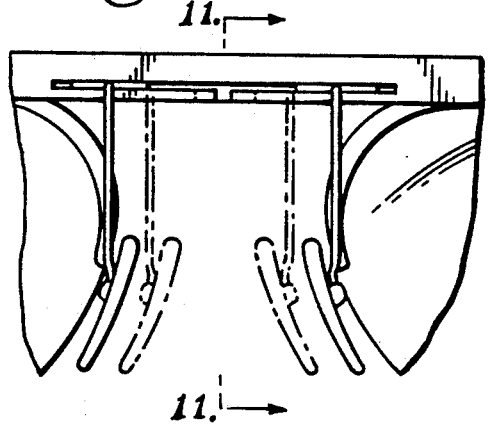
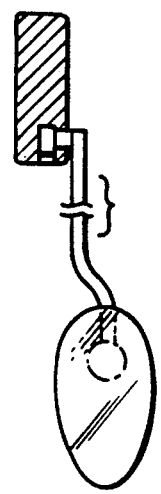
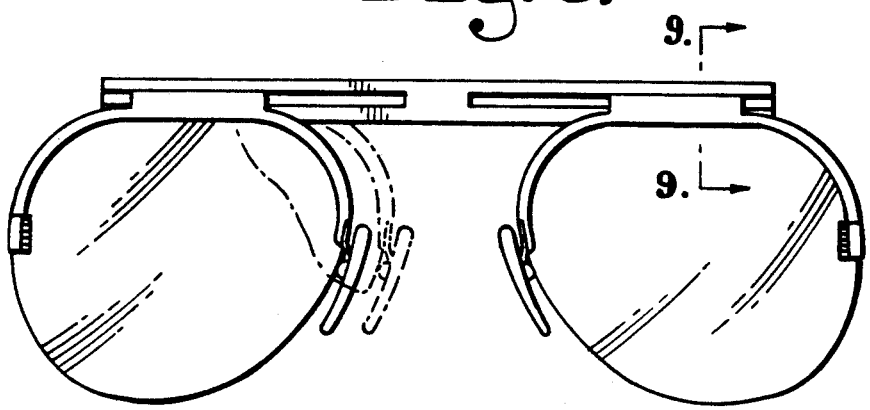
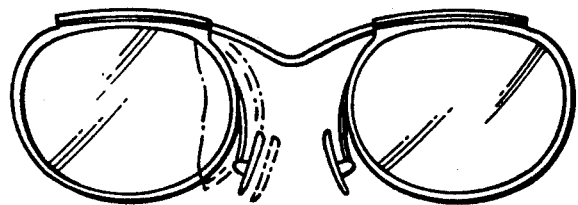
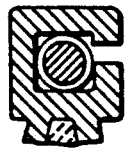
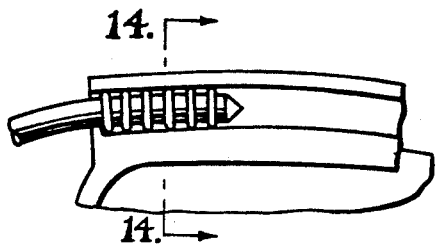

5,187,503

ADJUSTABLE EYEGLASS FRAMES

BACKGROUND OF THE INVENTION

1. Field of the Invention

The present invention relates generally to eyeglasses, and in particular to adjustable eyeglass frames.

2. Description of the Relevant Art

Many optometry patients require corrective lenses to achieve normal vision, for which eyeglasses or spectacles with corrective lenses are a popular choice. Non-corrective lenses are also worn many people as sunglasses or for eye protection.

Eyeglass frames are typically selected on the basis of such considerations as fit and aesthetics. Proper fit is generally achieved by optically centering the lenses in front of the patient's pupils. Because pupil spacing can vary considerably, accommodating a large number of eyeglass customers and patients can require the availability of a relatively large number of eyeglass frames, particularly if the customers and patients are to be given relatively wide selections among different styles.

Previous eyeglass frames which are adjustable are shown in the Kudelko U.S. Pat. No. 2,856,813 and the Kanda U.S. Pat. No. 4,820,035. However, heretofore there have not been available adjustable eyeglass frames with advantage and features of the present invention.

SUMMARY OF THE INVENTION

In the practice of the present invention, an adjustable eyeglass frame is provided which includes a face bar with opposite ends and a pair of lens subframes each mounting a nose pad assembly and a temple. The lens subframes are longitudinally, slidably, adjustably mounted on the face bar. In one embodiment of the invention, mounting structures on the lens subframes are slidably received in channel portions on the face bar and the lens subframes can be locked in place on the face bar. In another embodiment of the invention the lens subframe mounting structures are frictionally retained in the channel portions. In a further embodiment of the invention nose pad assemblies are slidably, adjustably mounted on the face bar. In yet another embodiment of the invention the face bar is telescopically, slidably received in a top-mounted tube of each lens subframe.

OBJECTS AND ADVANTAGES OF THE INVENTION

The principal objects and advantages of the present invention include: providing an adjustable eyeglass frame; providing such a frame which includes a face bar slidably, adjustably, mounting a pair of lens subframes; providing such a frame which includes a face bar slidably, adjustably mounting a pair of nose pad assemblies; providing such a frame which includes lens subframes with top-mounted tubes which telescopically receive face bar end portions; providing such a frame which can be adjusted to accommodate a number of different eyeglass wearers or patients; providing such a frame which can be assembled from different components to provide a relatively wide range of styles and appearances; providing such a frame which can be assembled from components comprising a variety of different materials; providing such a frame which requires few, if any, tools for assembly and adjustment to fit various wearers and optometry patients; and providing such a frame which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 8 is a vertical cross-sectional view of a lens frame comprising a first modified or alternative embodiment of the present invention.

FIG. 9 is an enlarged, fragmentary, vertical cross-sectional view thereof, taken generally along line 9—9 in FIG. 8.

FIG. 10 is a fragmentary, rear elevational view of an eyeglass frame comprising a second modified or alternative embodiment of the present invention.

FIG. 11 an enlarged, fragmentary, vertical cross-sectional thereof, taken generally along line 11—11 in FIG. 10.

FIG. 12 is a rear elevational view of an eyeglass frame comprising a third modified or alternative embodiment of the present invention.

FIG. 13 is an enlarged, fragmentary, rear elevational view thereof, particularly showing an adjustable lens subframe mounting means thereof.

FIG. 14 is an enlarged, fragmentary vertical cross-sectional view thereof, taken generally along line 14—14 in FIG. 13.

DETAILED DESCRIPTION OF THE INVENTION

I. Introduction and Environment

Figure 1:
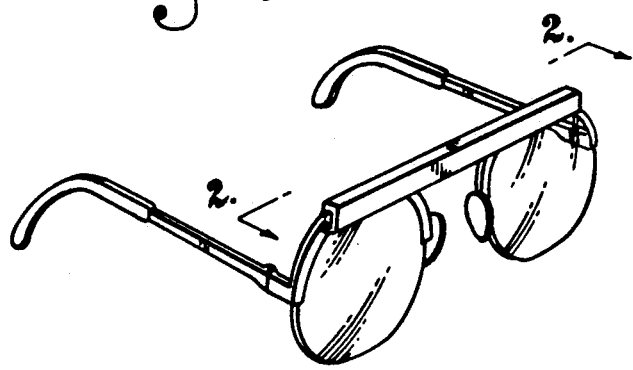
FIG. 1 is a top perspective view of a pair of eyeglasses with an eyeglass frame embodying the present invention.

Certain terminology will be used in the following description for convenience in reference only and will not be limiting. For example, the words "upwardly", "downwardly", "rightwardly" and leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 20 generally designates eyeglasses with a frame 22 embodying the present invention. The frame 22 generally comprises a face bar 24, a pair of lens subframes 26 mounting a pair of lenses 27, a pair of nose pad assemblies 28 and a pair of temples 30.

II. Face Bar 24

Figure 3:
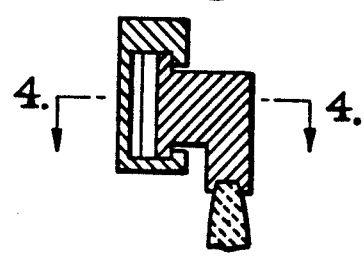
FIG. 3 is an enlarged, fragmentary, vertical cross-sectional view thereof taken generally along line 3—3 in FIG. 2.
Figure 2:
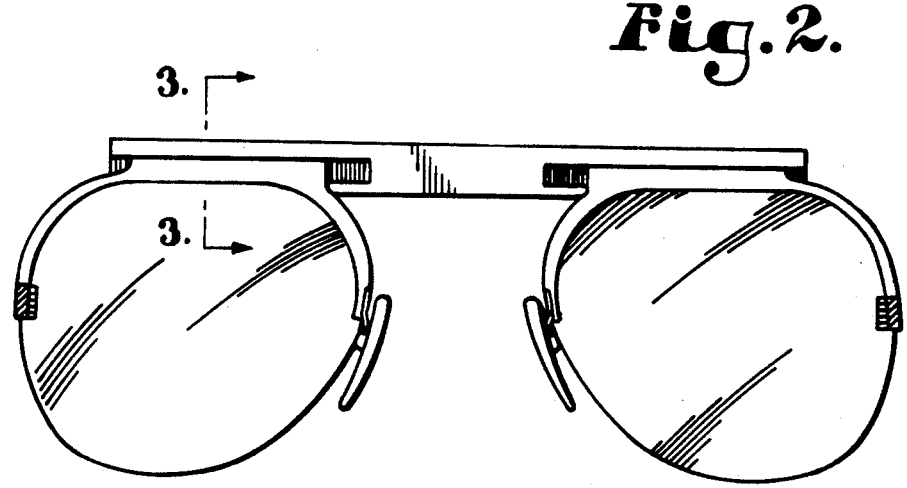
FIG. 2 is a vertical, cross-sectional view thereof taken generally along line 2—2 in FIG. 1.
Figure 5:
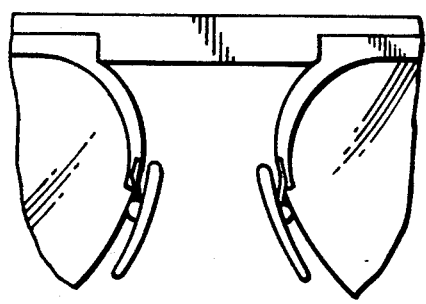
FIG. 5 is a fragmentary, rear elevational view thereof.

The face bar 24 includes opposite ends 32, a front 34, a back 36, a top 38 and a bottom 40. The face bar 24 includes channel means 42 comprising a pair of channel portions 44 each extending inwardly from and open at a respective end 32. As shown in FIG. 3, each channel portion 44 has an inner receiver 46 which is accessible through an access slot 48 open at the face bar back 36. The inner receiver 46 is vertically enlarged with respect to the access slot 48. The channel portions 44 terminate at a face bar center section 50. However, the channel means 42 could extend continuously across the face bar 24 between the opposite end 32 thereof.

A plurality of alternating, spaced lands 52 and grooves 54 are formed on a front face 56 of the channel inner receiver 46 and slant outwardly-and-rearwardly.

III. Lens Subframes 26

Each lens subframe 26 includes a lens wire or lens socket 58 configured to retain (e.g., by partially or completely encircling) a respective lens 27 and a mounting structure 60. The mounting structure 60 includes a leg 62 extending forwardly from an upper edge 64 of the lens retainer 58 and mounting a guide strip 66 generally in front of the lens retainer 58. As shown in FIG. 3, the vertical height of the guide strip 66 is greater than that of the mounting structure leg 62 whereby the guide strip 66 can be slidably received in the channel receiver 46 and the mounting structure leg 62 can be slidably received in the channel access slot 48. The guide strip 66 includes a front face 68 with alternating, spaced lands 70 and grooves 72 with slanted orientations which are parallel to the channel lands and grooves 52, 54 for selective intermeshing therewith. Each lens subframe 26 includes an inner side 74 mounting a nose pad assembly 28 and an outer side 76 mounting a temple 30.

IV. Assembly and Operation

Figure 4:
FIG. 4 is an enlarged, fragmentary, horizontal cross-sectional view thereof, taken generally along line 4—4 in FIG. 3 and showing an adjustable lens subframe mounting means in a position thereof.
Figure 7:
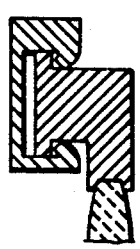
FIG. 7 is a fragmentary, vertical cross-sectional view thereof taken generally along line 7—7 in FIG. 6.
Figure 6:
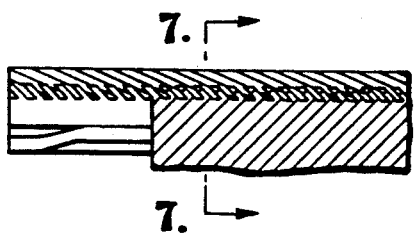
FIG. 6 is an enlarged, fragmentary, horizontal cross-sectional view thereof, taken generally at the same location as FIG. 4, but with the adjustable lens subframe mounting means in a lock position thereof.

The frame 22 is assembled by sliding the lens subframe mounting structures 60 into the respective channel portions 44 from the face bar ends 32 whereby the corresponding T-shaped cross-sectional configurations of the channel portions 44 and the mounting structure 60 correspond as shown in FIG. 3 to provide a relatively positive, secure sliding engagement therebetween. The channel means 42 and the mounting structures 60 collectively form a lens subframe adjustable mounting means 78, which has a slide position as shown in FIG. 3 and 4 and a lock position as shown in FIGS. 6 and 7. Placement of the mounting means 78 in its lock position can be achieved by crimping the face bar back 36 whereby the corresponding channel lands and grooves 52, 54 mate and intermesh with the corresponding guide strip lands and grooves 70, 72.

The adjustable spacing of the lens subframes 26 on the face bar 24 provides a relatively precise method of fitting the eyeglasses 20 to optometry patients with various pupil spacings, whereby the lenses 27 are properly spaced for alignment with the patient's pupils. The face bar 24 can be formed of a material, such as metal, which is malleable for crimping the subframe mounting means 78 in its lock position whereby the lens subframes 26 ar securely attached to and mounted on the face bar 24.

V. First Modified or Alternative Embodiment 120

A pair of eyeglasses 120 with a frame 122 comprising a first modified or alternative embodiment of the present invention is shown in FIGS. 8 and 9. The frame 122 includes a face bar 124, a pair of lens subframes 126, and a pair of lenses 127 mounted in the lens subframes 126. The eyeglass frame 122 is similar to the eyeglass frame 22, with the primary difference being a frictional fit between a mounting structure 160 of the lens subframe 26 within channel means 142. The face bar 124 and the lens subframes 126 can be manufactured for a relatively tight, slidable engagement whereby adjustments to the spacing of the subframes 126 on the space bar 124 can be made throughout the useful life of the frame 122. The face bar 124 could be crimped or otherwise deformed to secure the lens subframes 126 in place; alternatively, a relatively tight, sliding engagement therebetween can be provided to facilitate adjustments in the spacing of the lens subframes 126 from time to time.

VI. Second Modified or Alternative Embodiment 222

A pair of eyeglasses 220 with a frame 222 comprising a second modified or alternative embodiment of the present invention is shown in FIGS. 10 and 11. The frame 222 includes a pair of nose pad assemblies 228 which can be adjustably repositioned independently with respect to a face bar 224 and lens subframes 226. The face bar 224 includes a groove 230 open at a face bar back 232 and accessible through a passage 234 open at a face bar bottom 236 and a centered slot 238 open at the face bar back 232 and extending from the groove 230 to the face bar bottom 236. The groove 230 includes an enlarged inner portion 240 and a restricted outer portion 242.

Each nose pad assembly 228 includes a slide bar 244, a connector leg 246 extending rearwardly from the slide bar 244, an arm 248 extending downwardly from the connector leg 246 and a nose pad 250 mounted on the arm 248. The nose pad assemblies 228 are installed by inserting their slide bars 244 through the passage 234 and into the slot inner portion 240, with the connector legs 246 passing through the center slot 238 to the groove outer portion 242.

With the nose pads 228 thus installed, they can be adjustably slidably repositioned with respect to the face bar 224 for a comfortable fit on various optometry patients. The frame 222 can be fitted with slidably adjustable lens subframes 226 as provided on the frames 22 and 122 described above for adjustability of lenses 227 and nose pads 250. The nose pad assemblies 228 can be secured in place on the face bar 224 by any suitable means, such as an interlocking land-and-groove fastening and locking system, crimping or a frictional engagement.

VII. Third Modified or Alternative Embodiment 322

A pair of eyeglasses 320 including a frame 322 comprising a third modified or alternative embodiment of the present invention is shown in FIGS. 12-14. The frame 322 includes a face bar 324 and a pair of lens subframes 326. The face bar 324 includes a pair of opposite ends 328, which can be rounded or pointed as shown in FIG. 13. Opposite end portions 330 of the face bar 324 each includes a plurality of spaced, annular ridges or bands 332. A face bar center section 334 includes a downwardly convex, curvilinear configuration. The face bar end portions 330 are curved oppositely from the center section 334, i.e., in an upwardly-convex configuration. The face bar 324 thus has a configuration of a pair of shallow arches joined at their respective ends at the center section 334 of the face bar 324.

Each lens subframe 326 includes a top-mounted C-tube with an arched or upwardly-convex configuration generally conforming to the configuration of a respective face bar end portion 330. Each tube 336 includes a bore 338 extending between and open at opposite tube ends 340. The tube bore 338 is also open at a longitudinally-extending slit 342, which permits resilient gripping of the face bar end portions 330. The face bar end portions 330 can be sized larger than the normal, unassembled diameter of the bore 338 for resilient, gripping engagement. The face bar end portions 330 are telescopically, adjustably received in the tubes 336. The spacing of the lens subframes 326 can thus be adjusted to properly position lenses 327 on various optometry patients.

The eyeglass frames 22, 122, 222, and 322 can be reconfigured in various combinations. For example, face bars and lens subframes in various materials, colors and sizes can be intermixed to assemble a variety of different eyeglass frames to accommodate the pupil spacings an aesthetic preferences of a number of optometry patients with a stock or inventory of relatively few different eyeglass frame components.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

It is to be understood that while certain forms of the present invention have been illustrated and described herein, it is not to be limited to the specific forms or arrangement of parts described and shown.

What is claimed and desired to be secured by Letters Patent is as follows:

1. An eyeglass frame, which comprises:
   (a) a face bar with a pair of opposite ends, a front, a back, a top, and a bottom;
   (b) a pair of lens subframes, each including:
      (1) lens mounting means for mounting a lens;
      (2) an inner side; and
      (3) an outer side;
   (c) a pair of nose pad assemblies each mounted on one of said face bar and a respective lens subframe in proximity to a respective lens subframe inner side;
   (d) a pair of temples each mounted on a respective lens subframe outer side; and
   (e) selectively adjustable lens subframe mounting means longitudinally slidably adjustably mounting said lens subframes on said face bar, said lens subframe mounting means comprising:
      (1) channel means extends longitudinally with respect to said face bar and having opposite end portions each associated with a respective face bar end, said end portions being substantially longitudinally aligned with respect to each other and with respect to said face bar;
      (2) each said lens subframe having a guide strip longitudinally slidably received in said channel means in proximity to a respective end portion thereof in an adjustable configuration of said eyeglass frame; and
      (3) lens subframe locking means for locking said guide strip in said channel means in a permanent fixed configuration of said eyeglass frame by deforming one of said face bar and said guide strip.

2. The invention of claim 1 wherein said channel means end portions are discrete and separate.

3. The invention of claim 1 wherein said channel means extends continuously between said face bar opposite ends.

4. The invention of claim 1 wherein:
   (a) said channel means includes an inner receiver and an access slot open at said face bar back.

5. The invention of claim 4 wherein each said lens subframe includes:
   (a) a guide strip connecting leg connected to said guide strip and longitudinally, slidably received in said access slot.

6. The invention of claim 5 wherein:
   (a) each said guide strip has a greater height than a respective guide strip connecting leg.

7. The invention of claim 6 wherein said lens subframe mounting means includes lens subframe locking means for locking said lens subframes on said face bar.

8. The invention of claim 1, which includes:
   (a) a pair of nose pad assemblies; and
   (b) nose pad assembly mounting means for longitudinally, slidably, adjustably mounting said nose pad assemblies on said face bar.

9. An eyeglass frame, which comprises:
   (a) a face bar with a pair of opposite ends, a front, a back, a top, and a bottom;
   (b) a pair of lens subframes, each including:
      (1) lens mounting means for mounting a lens;
      (2) an inner side; and
      (3) an outer side;
   (c) a pair of nose pad assemblies each mounted on one of said face bar and a respective lens subframe in proximity to a respective lens subframe inner side;
   (d) a pair of temples each mounted on a respective lens subframe outer side;
   (e) adjustable lens subframe mounting means longitudinally slidably adjustably mounting said lens subframes on said face bar, said lens subframe mounting means including:
      (1) channel means extends longitudinally with respect to said face bar and having opposite end portions each associated with a respective face bar end; and
      (2) each said lens subframe having a guide strip longitudinally slidably received in said channel means in proximity to a respective end portion thereof;
   (f) said channel means including an inner receiver and an access slot open at said face bar back, said channel access slot being cross-sectionally restricted with respect to said channel inner receiver;
   (g) each said lens subframe including a guide strip connecting leg connected to said guide strip and longitudinally, slidably received in said access slot, each said guide strip having a greater height and a respective guide strip connecting leg; and (h) said lens subframe mounting means including lens subframe locking means for locking said lens subframes on said face bar, said lens subframe locking means including:
   (1) said face bar having alternating lands and grooves within said inner receiver;
   (2) said guide strip having alternating lands and grooves;
   (3) a slide position with respective face bar and guide strip lands and grooves disengaged; and
   (4) a lock position with respective face bar and guide strip lands and grooves intermeshing.

10. The invention of claim 9 wherein said face bar back is crimped forwardly with said subframe mounting means in its locked position.

11. An eyeglass frame, which comprises:
(a) a face bar with a pair of opposite ends, a front, a back, a top, and a bottom;
(b) a pair of lens subframes, each including:
   (1) lens mounting means for mounting a lens;
   (2) an inner side; and
   (3) an outer side;
(c) a pair of nose pad assemblies each mounted on one of said face bar and a respective lens subframe in proximity to a respective lens subframe inner side;
(d) a pair of temples each mounted on a respective lens subframe outer side;
(e) adjustable lens subframe mounting means longitudinally slidably adjustably mounting said lens subframe on said face bar;
(f) a pair of nose pad assemblies; and
(g) nose pad assembly mounting means for longitudinally, slidably, adjustably mounting said nose pad assemblies on said face bar, said nose pad assembly mounting means including:
   (1) each said nose pad assembly having a mounting bar and an arm with an upper end connected to the mounting bar and a lower end, each said nose pad assembly further having a nose pad connected to said arm lower end; and
   (2) said face bar having a longitudinally-extending receiver slidably adjustably receiving said mounting bars.

12. The invention of claim 11 wherein said adjustable lens subframe mounting means comprises:
(a) each said lens subframe including a longitudinally extending bore slidably, adjustably receiving a respective face bar opposite end.

13. The invention of claim 12 which includes:
(a) said face bar having a generally circular cross-sectional configuration; and
(b) each said face bar opposite end including a plurality of spaced, annular ridges.

14. An eyeglass frame, which comprises:
(a) a face bar with a pair of opposite ends, a front, a back, a top, and a bottom;
(b) a pair of lens subframes, each including:
   (1) lens mounting means for mounting a lens; said lens subframe mounting means comprising a lens retainer at least partially encircling the lens;
   (2) an inner side; and
   (3) an outer side;
(c) a pair of nose pad assemblies each mounted on one of said face bar and a respective lens subframe in proximity to a respective lens subframe inner side;
(d) a pair of temples each mounted on a respective lens subframe outer side;
(e) selectively adjustable lens subframe mounting means longitudinally slidably adjustably mounting said lens subframes on said face bar, said lens subframe mounting means comprising:
   (1) channel means extending longitudinally with respect to said face bar and having opposite end portions each associated with a respective face bar end, said end portions being substantially longitudinally aligned with respect to each other and with respect to said face bar;
   (2) said channel means including an inner receiver and an access slot open at said face bar back, said channel access slot being cross-sectionally restricted with respect to said channel inner receiver;
   (3) each said lens subframe having a guide strip fixedly secured to a respective lens retainer and longitudinally slidably received in said channel means in proximity to a respective end portion thereof in an adjustably configuration of said eyeglass frame; and
   (4) lens subframe locking means for locking said guide strip in said channel means in a fixed configuration of said eyeglass frame; and
(f) each said lens subframe including:
   (1) a guide strip connecting leg connected to said guide strip and longitudinally, slidably received in said access slot; and
   (2) each said guide strip having a greater height than a respective guide strip connecting leg.

* * * * *